(12) United States Patent
Sacks (10) Patent No.: US 9,497,937 B1
(45) Date of Patent: Nov. 22, 2016

(54) BIRD FEEDER WITH SHIELD

(71) Applicant: Alan Sacks, Dresher, PA (US)

(72) Inventor: Alan Sacks, Dresher, PA (US)

( * ) Notice: Subject to any disclaimer, the term of this patent is extended or adjusted under 35 U.S.C. 154(b) by 45 days.

(21) Appl. No.: 14/746,942

(22) Filed: Jun. 23, 2015

(51) Int. Cl.
*A01K 39/01* (2006.01)

(52) U.S. Cl.
CPC ................... *A01K 39/0113* (2013.01)

(58) Field of Classification Search
CPC ............... A01K 39/0113; A01K 39/014
USPC ............ 119/51.01, 51.03, 57.8, 57.9, 61.3, 119/61.57, 468, 469
See application file for complete search history.

(56) References Cited

U.S. PATENT DOCUMENTS

| | | | | |
|---|---|---|---|---|
| 2,799,244 | A * | 7/1957 | Dorsey | A01K 31/08 119/461 |
| 3,086,499 | A | 4/1963 | Dilley | |
| 3,399,650 | A * | 9/1968 | Goodman | A01K 39/0113 119/51.03 |
| 3,515,098 | A * | 6/1970 | Thurmond | A01K 5/0233 119/51.01 |
| 3,948,220 | A * | 4/1976 | Fiedler | A01K 39/014 119/51.03 |
| 3,977,363 | A | 8/1976 | Fisher, Jr. | |
| 5,086,730 | A * | 2/1992 | Figley | A01K 39/0113 119/51.01 |
| 5,361,723 | A | 11/1994 | Burleigh | |
| 5,377,617 | A * | 1/1995 | Harwich | A01K 53/00 119/57.8 |
| 5,377,619 | A * | 1/1995 | Katz | A01K 31/06 119/461 |
| D381,135 | S | 7/1997 | Hochlan, Jr. | |
| 5,791,286 | A | 8/1998 | Taussig et al. | |
| D452,048 | S * | 12/2001 | Colwell | D30/119 |
| 6,986,322 | B2 | 1/2006 | Lumpkin | |
| 7,017,517 | B2 * | 3/2006 | Paquette | A01K 39/014 119/51.01 |
| 7,353,774 | B2 * | 4/2008 | Bradeen | A01K 39/0106 119/52.3 |
| 7,861,670 | B2 * | 1/2011 | Berns | A01K 39/012 119/429 |
| 2011/0271910 | A1 * | 11/2011 | Baynard | A01K 39/0206 119/51.5 |

OTHER PUBLICATIONS

Cubie, Doreen, "Thwarting Backyard Thieves," National Wildlife (World Edition); Oct./Nov. 2013; vol. 51, Issue 6, pp. 38-41.
"Woodlink Audubon 6" Torpedo Steel Squirrel Baffle"; Wayfair. com, http://www.wayfair.com/Audubon-6-Torpedo-Steel-Squirrel-Baffle-NATORPEDO-WDL1040.html, printed Jun. 23, 2015.

* cited by examiner

*Primary Examiner* — Yvonne Abbott-Lewis
(74) *Attorney, Agent, or Firm* — Muir Patent Law, PLLC (57) ABSTRACT

A ground-mounted bird feeder includes a shield to prevent squirrels from accessing the feeder portion of the bird feeder. The ground-mounted bird feeder may include a post and a feeder mounted on the post, and a shield may be placed below a bottom of the feeder, and may also be above the feeder.

24 Claims, 8 Drawing Sheets

BIRD FEEDER WITH SHIELD

BACKGROUND

Bird feeders are under constant attack by squirrels and other non-aviary, uninvited free-riders who find ways to access the food placed in the bird feeder. There have been numerous attempts to prevent animals such as squirrels from accessing bird feeders. For example, U.S. Pat. Nos. 3,977,363, 5,086,730, 5,361,723, 5,791,286, and 6,986,322 describe various bird feeder designs intended to deter squirrels from accessing the bird feeder. Some of these include baffles placed above or below a location where bird feed can be accessed. Other deterrent methods include squirrel-repellant such as chili powder, grease, or other substances that make it difficult or undesirable for a squirrel to approach the bird feeder.

Some squirrel-resistant bird feeders are intended for hanging from a tree or other structure. Other bird feeders are intended to be mounted on the ground, for example on a post that may be placed on or in the ground. For ground-mounted bird feeders, some include a post made of a material that does not permit a squirrel to dig its claws into the material, such as metal. Though this may be helpful, for smaller-sized posts (e.g., having a diameter of less than about 4 inches), squirrels can often still climb up the post from the ground by clasping their paws together and shimmying up the post. Some deterrents have been explored, including baffles placed on the pole. However, though these baffles may have a shape that deters some squirrels from reaching the feeder from below, they typically have no effect in preventing squirrel access from the side of from above, and may even assist the squirrels in reaching the feeder from the side or from above, such as from a nearby tree or fence.

As such, a shield that prevents squirrels and other land animals from accessing bird feed in a ground-mounted bird feeder from the side, above, and/or the ground would be highly useful.

SUMMARY

The disclosed embodiments describe a new bird feeder that includes a shield to prevent squirrels from accessing a bird feeder, particularly for a ground-mounted bird feeder. In certain embodiments, a ground-mounted bird feeder includes a post and a feeder mounted on the post, and a shield is placed below a bottom of the feeder, and may also be above the feeder.

According to some embodiments, a ground-mounted bird feeder includes a post, a feeder mounted on the post, and a shield attached to the post and mounted below the feeder. The shield, which may be referred to as a lower shield, may include a first, lower portion having first walls that diverge from each other from bottom to top, a second, upper portion having second walls that converge toward each other from bottom to top, and an interface where the first lower portion of the shield meets the second upper portion of the shield. A size and shape of the first walls at the interface may be the same as the size and shape of the second walls at the interface. An additional shield may be included above the feeder. The additional shield may have third walls that converge toward each other from bottom to top, and overhang at least a portion of the feeder to prevent squirrels from reaching the feeder from above the feeder or from the same height as the feeder. The different walls of the upper and lower shield may have particular angles that prevent squirrels from accessing the feeder. For example, for the lower shield, a bottom of the first walls may connect to the post at a first vertical height on the post, and a minimal distance between the bottom of the first walls and a top of the first walls may be greater than a maximum reach distance of a squirrel. The various walls may be formed of a hard, smooth material whose surface prevents squirrels from gripping the walls. From a top-down view, the area covered by the walls of the upper shield at the bottom of the upper shield may surround the area of the first walls at a top of the first portion of the lower shield. The combination of the lower shield and the upper shield can prevent squirrels from accessing the feeder from above, beside, or below the feeder.

BRIEF DESCRIPTION OF THE FIGURES

The accompanying drawings are included to provide a further understanding of the disclosed embodiments, and are incorporated in and constitute a part of this specification. The drawings, together with the description, illustrate exemplary embodiments, and are not intended to limit the scope of the invention to any particular example given. Certain aspects of the invention are depicted in different figures, and certain aspects are omitted from certain figures. Therefore, the figures should be taken as a whole as examples disclosing various aspects and embodiments of the invention. In the drawings, the size and relative sizes of objects and portions of objects may be exaggerated for clarity. Like numbers refer to like elements throughout. In the drawings.

DETAILED DESCRIPTION

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

The terminology used herein is for the purpose of describing particular embodiments only and is not intended to be limiting of the invention.

As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

Further, it will be understood that, although the terms first, second, third etc. may be used herein to describe various objects, components, and sections, these objects, components, and/or sections should not be limited by these terms. Unless the context indicates otherwise, these terms are only used to distinguish one object, component, or section from another object, component, or section, for example as a naming convention. Thus, a first object, component, or section discussed below in one section of the specification could be termed a second object, component, or section in another section of the specification or in the claims without departing from the teachings of the present disclosure. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise.

Embodiments described herein will be described referring to plan views and/or cross-sectional views by way of ideal schematic views. Accordingly, the exemplary views may be modified depending on manufacturing technologies and/or materials. Therefore, the disclosed embodiments are not limited to those shown in the views, but include modifications in configuration formed on the basis of manufacturing processes and construction variations. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. However, with respect to a ground-mounted device, orientations such as "up" and "down" should be considered with respect to the ground.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that do not substantially affect operation or usage of the components or devices being described and that may occur, for example, due to manufacturing processes. The term "substantially" may be used herein to reflect this meaning. Terms such as "approximately," or "about" may reflect measures or amounts that are nearly the same and within an amount of variation that does not substantially affect operation or usage of the components or devices being described.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
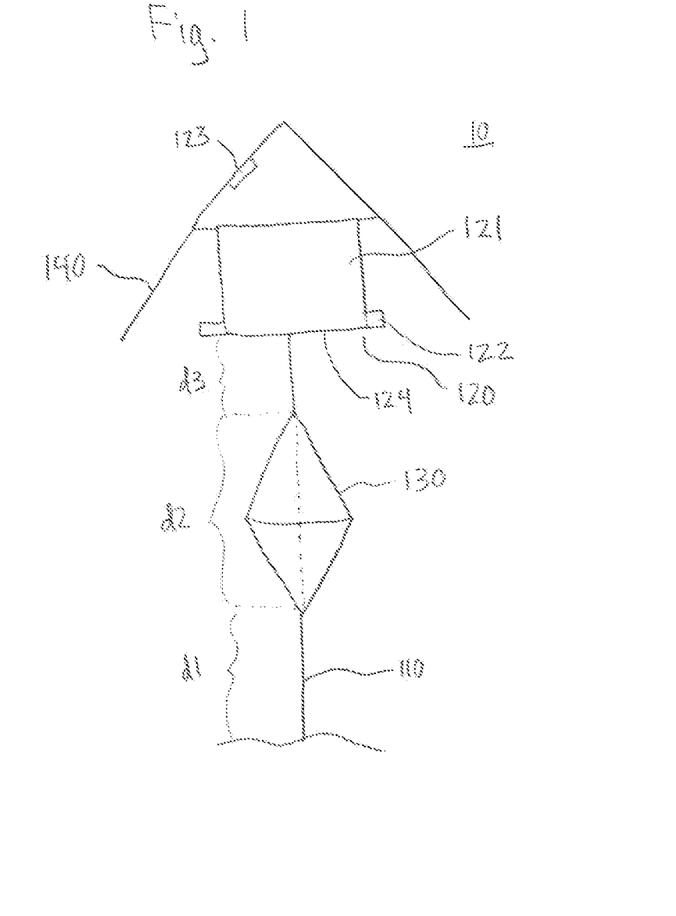
FIG. 1 illustrates a bird feeder, according to certain exemplary embodiments.

FIG. 1 illustrates an exemplary bird feeder 10 according to certain embodiments. As shown in FIG. 1, bird feeder 10 includes a post 110, a feeder 120, and a shield 130, also referred to as a lower shield. Bird feeder 10 may additionally include a shield 140, also referred to as an upper shield. In certain instances, shields 130 and 140 may be referred to together as a shield (e.g., including a lower shield portion 130 and upper shield portion 140). However, each of shields 130 and 140 may also be referred to individually as shields. These shields may also be referred to as baffles, or squirrel deterrent structures or ground animal deterrent structures.

In certain embodiments, post 110 has a linear shape, and is configured to be mounted on the ground. However, the post 110 need not have a linear shape, and can be curved or angled to some degree (e.g., to a degree that still makes it difficult for a squirrel to climb it). In one embodiment, a bottom of the post 110 may have a pointed shape in order to be driven into the ground and partly buried therein. However, other configurations for the bottom of post 110 are possible, that allow it to be mounted in or on the ground (e.g., a screw-type bottom, or other shapes that can be placed in a ditch and covered with earth). In certain embodiments, the post 110 for a ground-mounted birdfeeder may be configured for placement on a horizontal surface, such as a deck, patio, or roof. Thus, the term "ground-mounted" need not refer to an earth-type ground, but can refer to other surfaces that can serve as a ground or floor on which land animals can walk.

Post 110 may have one of various different cross-sectional shapes. For example, it may be a square-shaped post, or a circular post. Post 110 may have a width, for example, in the range of about 1 inch wide to about 4 inches wide, and may have the same width throughout, or may have a slightly increasing or decreasing width.

In one embodiment, post 110 is made of a material that provides a smooth, hard surface that assists in preventing squirrels or other ground animals from climbing the post. For example, the material may prevent a squirrel from digging its claws into the post 110. Post 110 may be formed to avoid including substantial protrusions capable of supporting a squirrel or other animal's foot as a stepping or gripping point. Post 110 may be made of metal or plastic, for example. In other examples, however, post 110 may be made of wood, and even if a squirrel can climb the post, as described in greater detail below, the squirrel will be thwarted from reaching the feeder 120 by the shield 130 and optional shield 140.

Post 110 may include one or more mounting areas that allow components, such as a lower shield 120, feeder 130, and upper shield 140 to be mounted on and attached to the post 110. These mounting areas will be described in greater detail below.

Feeder 120 may be one of many types of feeders capable of being mounted on post 110, holding bird feed (hereinafter referred to as "food"), and providing a perch and a tray or other accessible component to allow birds access to the food. For example, feeder 120 may include a container 121 for filling with food, and or more trays 122, which allow a small amount of the food to be accessed at one time by birds. The trays 122 may double as perches, or additional perches may be included. In one embodiment, the trays 122 are at a location near the bottom of the container 121 to allow the food in the container 121 to automatically dispense to the trays 122. The feeder 120 may have different shapes, such as a typical "house" shape, a simple box shape, or a cylinder shape, for example. In certain embodiments, feeder 120 has radial symmetry. Also, though only two exemplary trays 122 are shown, additional trays may be included. Also, alternative or additional trays may be included at different vertical levels of the feeder 120.

Figure 2A:
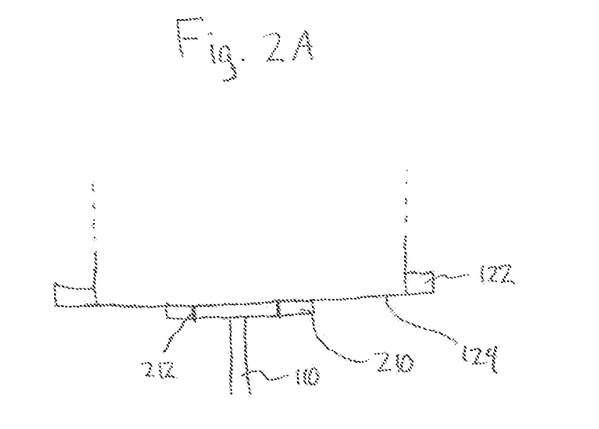
FIG. 2A illustrates an exemplary mounting area of a post where a feeder of a bird feeder may be mounted, according to one exemplary embodiment.

Feeder 120 may additionally include a door 123 for filling the container 121 with food. In one embodiment, the feeder 120 includes a base portion 124. The base portion 124 may be mounted on the post 110, for example using one of various mounting components. For example, in one embodiment, a mounting area of the post where the feeder is to be mounted may have a platform shape, such as shown in FIG. 2A, and the feeder may be mounted on the platform 210 using, for example, screws 212, or other fasteners. Thus, a mounting assembly, such as a platform 210 may be included as part of the post 110 of the bird feeder 10. The mounting assembly may be separately attachable to the post 110, for example, using screws, nails, glue, and/or other fasteners.

Figure 2B:
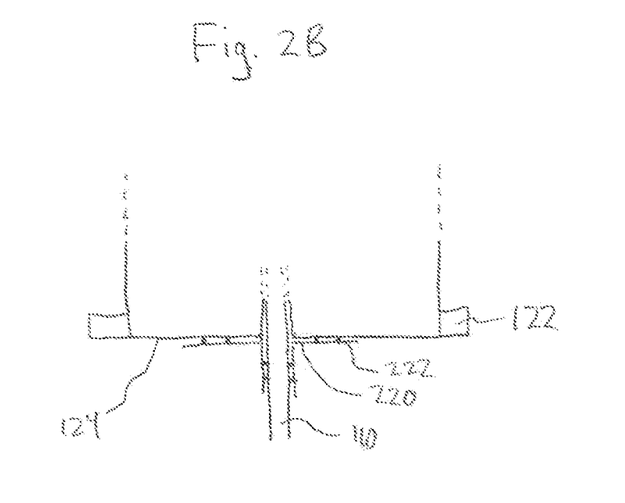
FIG. 2B illustrates an exemplary mounting area of a post where a feeder of a bird feeder may be mounted, according to another exemplary embodiment.

In another embodiment, a mounting area of the post where the feeder is to be mounted may be outfitted with a mounting assembly such as brackets 220, such as shown in FIG. 2B. These brackets 220 may be attached to the post 110, for example using a fastener such as nails, screws, and/or glue. A base 124 of a feeder may then be mounted on the brackets 220, and attached thereto using additional fasteners, such as screws 222, or other fasteners. In an embodiment such as shown in FIG. 2B, the post 110 may extend through the feeder (e.g. through the base 124 of the feeder 120 to pass through an inside of the feeder 120). In certain embodiment, as described further below, the post 110 may extend to pass through a top of the feeder 120 as well, such that an upper shield (e.g., 140) can be mounted on the post 110 above the feeder 120.

Figure 3A:
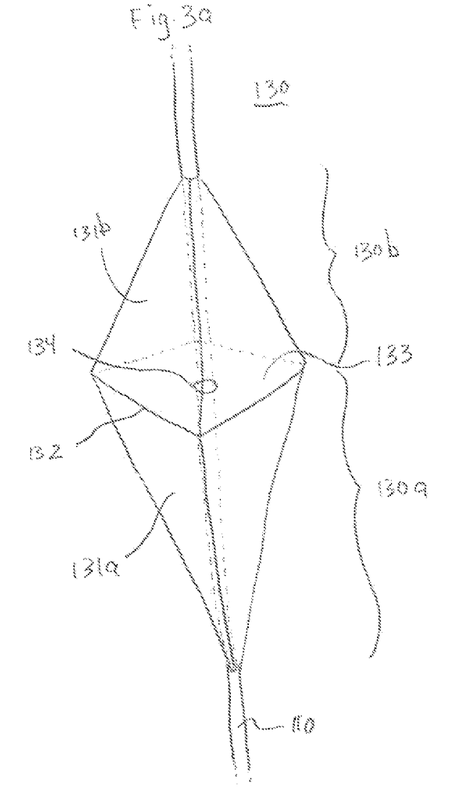
FIG. 3A illustrates a shield for placing on a post of a bird feeder, according to certain exemplary embodiments.
Figure 3B:
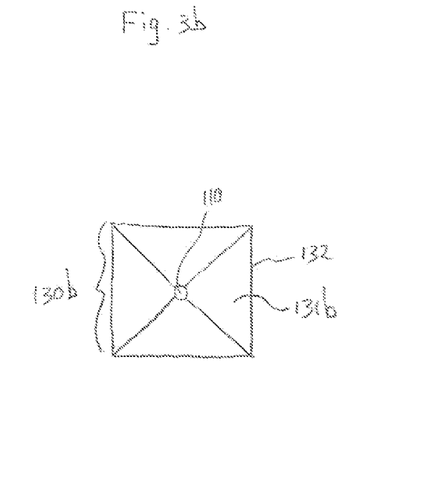
FIG. 3B is an exemplary overhead view of a portion of a shield for a bird feeder, according to certain exemplary embodiments.

FIG. 3A illustrates a shield 130 for placing on a post of a bird feeder, according to certain exemplary embodiments. FIG. 3B illustrates an overhead view of the shield 130.

As shown in FIG. 3A and with reference to FIGS. 1, 2A, and 2B, the shield may be placed below the feeder 120. Additional description of the placement of the shield will be described further below.

In one embodiment, the shield 130 includes a first, lower portion 130a and a second, upper portion 130b. The lower portion 130a may have first walls 131a that diverge from each other from bottom to top. For example, the first walls 131a may be closer to each other at the bottom of the lower portion 130a than at the top of the lower portion 130a. These walls may be described as having a negative slope. In one embodiment, the lower portion 130a includes four walls 131a that form a pyramid shape. However, other configurations may be used. For example, a pyramid shape with three walls may be used. Or more than four walls may be used. In certain embodiments, the lower portion 130a may have a cone shape, for example having a circular rather than angled cross section when viewed from above. Though such a configuration may have one continuously curved surface, it may still be referred to as including a plurality of walls, or side walls—for example four side walls where two are opposite each other in a first direction and the other two are opposite each other in a second direction. The walls may form one continuous structure (e.g., without angles).

The upper portion 130b may have second walls 131b that converge from each other from bottom to top. For example, the second walls 131b may be further from each other at the bottom of the upper portion 130b than at the top of the upper portion 130b. These walls may be described as having a positive slope. In one embodiment, the upper portion 130b includes four walls 131b that form a pyramid shape. However, other configurations may be used. For example, as described with respect to the lower portion 130a, a pyramid shape with three walls may be used. Or more than four walls may be used. In certain embodiments, the upper portion 130b may have a cone shape, for example having a circular rather than angled cross section when viewed from above. Though such a configuration may have one continuously curved surface, it may still be referred to as including a plurality of walls, or side walls—for example four side walls where two are opposite each other in a first direction and the other two are opposite each other in a second direction. The walls may form one continuous structure (e.g., without angles).

In certain embodiments, as shown in FIG. 3A, the lower portion 130a may have an upside-down pyramid shape or upside-down cone shape, and the upper portion 130b may have a right-side up pyramid shape or right-side up cone shape. The shapes may be matching.

In certain embodiments, the lower portion 130a meets the upper portion 130b at an interface 132. The size and shape of the first walls 131a at the interface 132 may be the same as the size and shape of the second walls 131b at the interface 132. As such, in certain embodiments, the size and shape of the top of the lower portion 131a may match the size and shape of the bottom of the upper portion 131b at the interface 132 between the two.

As shown in FIG. 3A, the first walls 131a and second walls 131b may each surround the post 110. FIG. 3B shows an exemplary overhead view of the upper portion 130b and upper walls 131b surrounding the post 110. An underbelly view of the lower portion 130a may be similar.

In certain embodiments, shield 130 includes a base portion 133 at the interface that forms a base of the upper portion 130b and of the lower portion 130a. This base portion 133 may have a hole 134 formed therein, which surrounds the post 110. The base portion 133 may thus provide additional support for the shield 130 and may assist in more strongly connecting the shield 130 to the post 110.

In certain embodiments, walls 131a and 131b are formed of a hard, smooth material having a surface substantially incapable of being gripped by a squirrel. For example, the walls may be formed of metal (e.g., sheet metal), or hard plastic. As discussed in greater detail below, the walls may have a size and shape that, combined with the hardness and smoothness of the material, both prevents a squirrel from digging its claws into the walls, and prevents the squirrel from being able to wrap its arms around the shield to grip the shield using opposing force from its limbs. For example, where a pyramid structure is used, the slopes of the walls may be steep enough, and the angles where sides meet may be obtuse enough to prevent a squirrel from holding on to the shield. In addition, a length of the sides may be long enough so that a squirrel is incapable of reaching from a bottom to top of a shield portion, or from one edge of one wall to an opposite edge of the wall as the walls get further away from each other. Or, where a cone shape is used that has continuously curved walls, there may be no angled portions for a squirrel to gain any grip.

Shield 130 may include a separate upper portion 130b from the lower portion 130a, which may be connected together using, for example hinges, glue, and/or other connection devices. Similarly, where separate, flat walls are used for each portion of the shield 130, the walls may be connected to each other using, for example hinges, glue, or other connection devices. In certain embodiments, any connection devices used have no external protrusions, to avoid any gripping points on the external edges or surfaces of the walls. In certain embodiments, however, each portion of shield 130, or the entire shield 130, may be formed of a single continuous material (e.g., the shield 130 may be molded). Also, though examples are given that show the slopes of the walls being linear, the slopes may be curved, such that the walls are curved and even avoid angles at the interface 132 where the upper portion 130b meets the lower portion 130a. In certain embodiments, the shield 130 may be placed on the post 110 by sliding the post 110 through an opening in the top and bottom of the shield 130. In other embodiments, the shield 130 may be placed on the post by having an opening and closing mechanism (e.g., a hinge on one side and an internal clip on the other) that allows the shield 130 to be opened and then be closed around the post 110.

Different exemplary dimensions, angles, and connection assemblies that may provide for optimal deterrence are discussed below in connection with FIGS. 4A, 4B, 5A, and 5B.

Figure 4A:
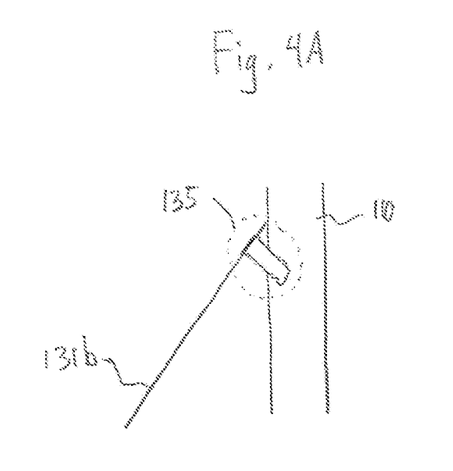
FIGS. 4A and 4B are exemplary views showing an exemplary coupling assembly for connecting a shield to a post of a bird feeder.
Figure 4B:
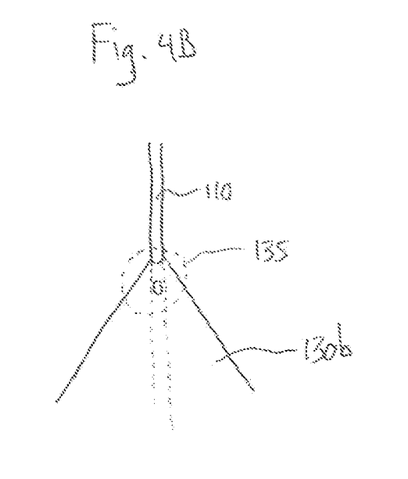

FIGS. 4A and 4B are exemplary views showing an exemplary coupling assembly for connecting a shield to a post of a bird feeder.

As shown in FIGS. 4A and 4B, shield 130 may include a coupling assembly 135 for attaching and securing the shield 130 to the post 110. The coupling assembly 135 may have various forms configured to provide for a secure attaching of the shield 130 to the post 110. For example, in one embodiment, coupling assembly 135 may include a screw or nut, one or more washers, optional bolts, and a matching threaded section or bushing in the post 110. The matching threaded section or bushing may be included in a mounting area of the post 110. Different mounting areas of the post 110 may be located at different heights—for example, a first height above the ground for the lower portion 130a and a second height above the first height for the upper portion 130b. In certain embodiments the coupling assembly 135 may have a plurality of duplicate components, one set of components for each of a plurality of sides of the shield 130. Or only one set of components may be used. In addition, both a bottom of the lower portion 130a and a top of the upper portion 130b of shield 130 may include coupling assemblies 135.

In one embodiment, a coupling assembly 135 is used that provides for minimal or no protrusions on the outside of the shield 130. As such, coupling assemblies 135 may be provided such that, when assembled, a first area where a first coupling assembly connects to a first mounting area of the post 110, and/or a second area where a second coupling assembly connects to a second mounting area of the post 110, are free from protrusions large enough to be gripped by a squirrel. As one example, a bolt or screw may be used that is flush with the surface of the shield 130 at the outside surface of the shield 130.

Figure 5A:
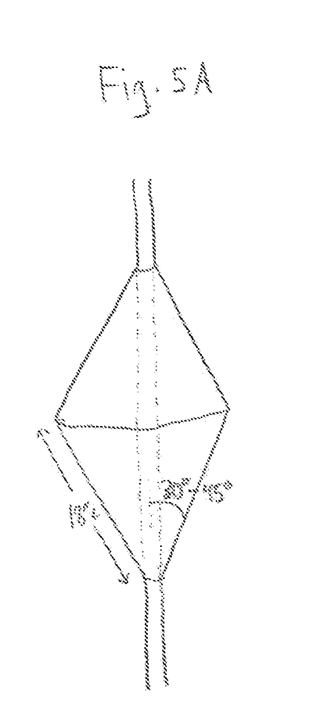
FIG. 5A is a cross-sectional example of a shield such as shown in FIG. 2A, including exemplary dimensions according to certain exemplary embodiments.
Figure 5B:
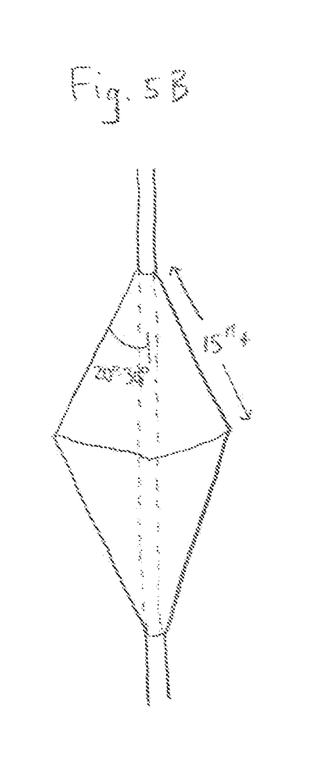
FIG. 5B is a cross-sectional example of a shield such as shown in FIG. 2A, including exemplary dimensions according to certain exemplary embodiments.

FIG. 5A is a cross-sectional example of a shield such as shown in FIG. 2A, including exemplary dimensions according to certain exemplary embodiments. FIG. 5B is a cross-sectional example of a shield such as shown in FIG. 2A, including exemplary dimensions according to certain exemplary embodiments.

Various tests have been undertaken using different lengths and angles for the walls to determine optimal lengths of the walls 131a and 131b, as well as optimal angles of the walls with respect to a horizontal and vertical axis. In particular, a shield has been developed that deters squirrels both from below (e.g., the ground) and from above of the side. As such, this allows the ground-mounted bird feeder 10 to be placed near objects such as trees, bushes, fences, decks, etc., which may provide squirrels with potential access to the feeder 120 from below, the side, or above.

For example, it has been found that a length of at least about 18 inches for the first walls 131a prevents squirrels from accessing the bird feeder from below. This length is approximately the maximum length of the reach from foot to outstretched hand of a squirrel, such as a gray squirrel. For example, in certain embodiments, a minimum distance in a straight line along the first walls 131a between the interface 132 and a first area at a first vertical height on the post 110 where the post 110 coincides with a bottom of the first lower portion 130a of the shield 130 is at least 18 inches. As such, a minimal distance between the first area and the interface along 132 the first walls 131a may be greater than a maximum reach distance of a squirrel.

It has further been found that an angle with respect to the post 110 of between about 30 degrees and about 45 degrees for the first walls 131a best prevented squirrels from reaching the feeder 120 from below. The combination of a sufficiently negative slope (e.g., 30-45 degrees), long enough distance (e.g., longer than the reaching distance of a squirrel), and smooth and hard material incapable of being gripped by a squirrel can make it impossible for a squirrel to either climb the shield itself or to jump off of the post in a manner that would allow the squirrel to reach a top of the shield. In particular, because of the negative slope and length of the walls, a squirrel cannot even attempt to jump upward to reach the feeder, but rather can only jump at an angle away from the post, which ultimately results in the squirrel falling to the ground.

It has been found that a length of at least about 15 inches for the second walls 132a prevents squirrels from accessing the bird feeder from the side or above. A length of 18 inches—for example, approximately the maximum length of the reach from foot to outstretched hand of a squirrel—may be effective as well, but a length of 15 inches prevented nearly all squirrels from reaching the feeder 120 from the side or from above. For example, a minimum distance in a straight line along the second walls 131b between the interface 132 and a second area at a second vertical height on the post 110 where the post 110 coincides with a top of the first upper portion 130b of the shield 130 may be at least 15 inches, or in certain embodiments, at least 18 inches.

It has further been found that an angle with respect to the post 110 of between about 20 degrees and about 30 degrees for the second walls 131b best prevented squirrels from reaching the feeder 120 from the side or from above. For example, even if squirrels reached the shield 130 from the side or above, they were unable to hold onto the shield 130 or to reach the post 110 upon landing, particularly when a hard smooth surface was used and the second walls 131b were at least 15 inches in length and at an angle of between about 20 degrees and about 30 degrees with respect to the post 110.

The combination of angle ranges described above, along with the lengths is especially useful in that, where straight side walls are used, it provides for a fairly obtuse angle at the interface 132 at which, without any other protrusions, a squirrel will typically be unable to hold on to the interface. For example, due to the reverse angle at which the squirrel is forced to orient itself, combined with the distance between the post 110 at the bottom of the lower portion 131a and the interface 132, the hard, smooth surface of the walls 131a and 131b, and the obtuse angle at the interface 132, it is nearly impossible for a squirrel to reach the feeder from below. In some cases, because of this obtuse angle, side walls for the lower portion 131a may be slightly shorter than a squirrel's reach, and squirrels will still be prevented from getting past the lower shield 130. In addition, due to the fairly steep angle of 60-70 degrees (with respect to the horizontal) of the top walls and the smooth and hard surfaces, again combined with the obtuse angle of the interface 132, it is nearly impossible for a squirrel to hold on to the upper portion 131b even if it lands squarely on that portion from the side or above. As such, the squirrel will fall off of the shield onto the ground after attempting to climb toward the feeder 120.

Figure 6A:
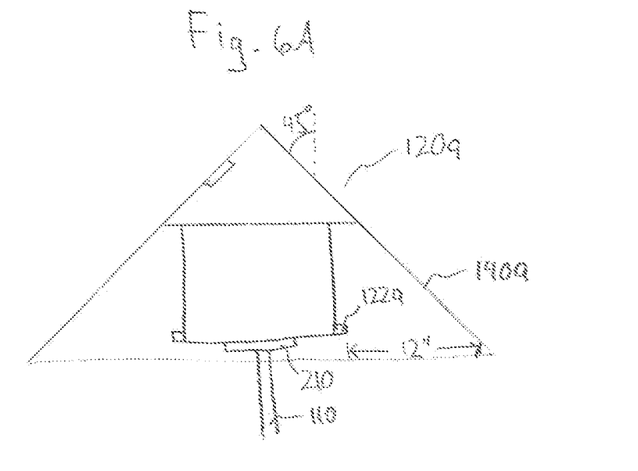
FIGS. 6A-6C illustrate exemplary feeders including supplemental shields, according to certain exemplary embodiments.
Figure 6B:
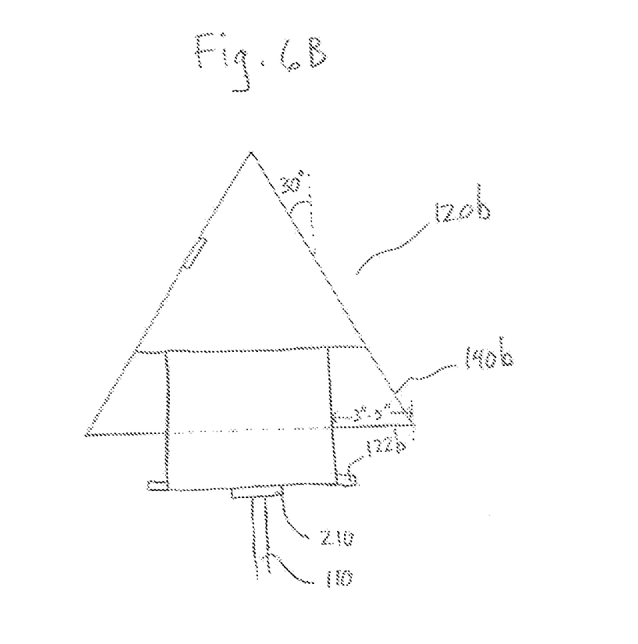
Figure 6C:
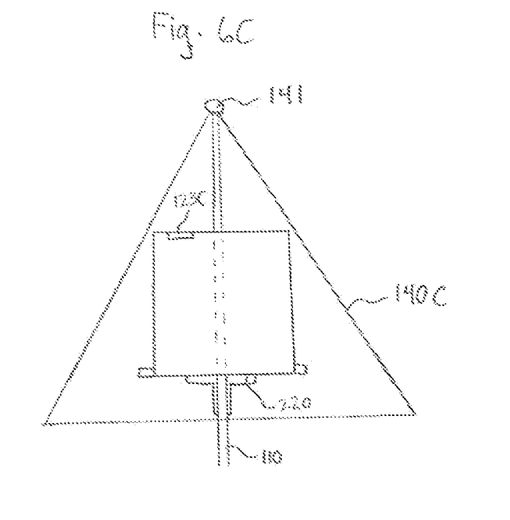

In certain embodiments, to even better protect the feeder 120 from squirrel attacks, a supplemental shield may be used at a top of the feeder 120, that further prevents access to the feeder 120 from the side and from above. Such a shield may be formed as part of a roof of feeder 120, or as an extension of a roof of feeder 120, or may be separately formed. Examples of such a shield are depicted in FIGS. 6A-6C. It should be noted that FIGS. 6A-6C show only certain components of bird feeder 10, and other components such as described in the various other figures may be omitted from the drawing of FIGS. 6A-6C.

As shown in FIG. 6A, a feeder 120 may be mounted on a post 110 in a manner such as shown in FIG. 2A, for example, using a platform 210. The feeder 120 may include, either as part of its roof, or as an extension of the roof or as a separate piece that can be placed on the roof and attached thereto (e.g., using a cap), a shield 140a. Shield 140a, which may be referred to as an additional shield, a second shield, or an upper or upper-mounted shield, may be formed, for example, of a hard, smooth material such as metal or plastic, similar to the types of material that can be used to form the first shield 140 described in connection with the figures discussed above, also referred to as a lower or lower-mounted shield.

FIG. 6B illustrates a similarly structured feeder 120 and shield 140b, but with different angles and dimensions. For example, in certain embodiments, as depicted in FIG. 6A, a distance in a horizontal direction between an outer edge of a perch or feed tray 122a of feeder 120a and a bottom edge of shield 140a is at least about 12 inches, and an angle between a side wall of the shield 140a and a line parallel to the post 110 is about 45 degrees. In other embodiments, such as depicted in FIG. 6B, if shield 140b only partly vertically covers the feeder 120b, a distance in a horizontal direction between an outer edge of feed tray 122b or a side of feeder 120b, and a bottom edge of shield 140b is at least about 3 inches (e.g., between about 3 inches and about 5 inches), and an angle between a side wall of the shield 140b and a line parallel to the post 110 is between about 20 and about 30 degrees (30 degrees is given as an example in FIG. 6B). As such, in certain embodiments, a less steep slope and longer walls maybe used, and in other embodiments, a steeper slope and shorter walls may be used (e.g., slopes may vary between about 20 and 45 degrees, and wall lengths that permit between about 3 inches and about 12 inches between an edge of the shield 140 and an outside of the feeder 120 or feed tray 122 may be used). Aspects of the embodiments of FIGS. 6A and 6B may be combined. For example, for any angle used, the edges of the shield may extend to overhang below the bottom portion of the feeder 120, or may extend to only partly vertically overlap with the feeder. In certain embodiments, the edge of the shield 140 extends vertically at least to be at a same vertical level as a bottom of the feeder. However, one optimal configuration determined based on significant experimentation is a 20-30 degree slope combined with at least about 3 inches of space between a bottom edge of the shield 140 and an outside of the feeder 120 or feed tray 122, where the shield 140 extends only partly along the feeder 120 in a vertical direction (e.g., the edge of shield 140 is above a bottom of the feeder 120). Such a configuration, as tested, had the effect of preventing squirrels from even attempting to jump to the feeder from an adjacent tree, while allowing birds at the feeder to be visible below a bottom of the shield 140 as they feed from the feeder 120.

To avoid duplicative explanation, it should be noted that shields 140a and/or 140b can be constructed using similar materials and to have a similar structure as the upper portion 130a of shield 130 discussed previously (e.g., metal or plastic; pyramidal or cone shape; straight or curved sides; etc.).

FIG. 6C illustrates a different embodiment, wherein the upper-mounted shield 140c is separately formed from the feeder 120 and attaches to the post 110. In this embodiment, the feeder 120 may be mounted on a post 110 in a manner such as described above in connection with FIG. 2B, and the post may pass entirely through feeder 120. In this example, the upper-mounted shield 140c is attached directly to the post 110. For example, it may be connected using a cap 141, which may couple to a coupling assembly on the post 110, such as a bolt and a threaded cap. In one embodiment, the cap can be both securely fastened and easily removed, in order to allow easy filling of the feeder, for example from a door 123c. Other construction, structure, and dimensions and angles with respect to the feeder 120 may be the same or similar to those discussed above in connection with FIGS. 6A and 6B.

As discussed above, though some examples for the upper-mounted shield 140 depict the lower edge of the shield 140 extending vertically near or beyond a bottom of the feeder 120, for example, where a feeding tray 122 may be located, these lower edges may be at a height above the bottom of the feeder 120, as depicted in FIG. 6B for example, to allow easier viewing of the birds feeding at the feeder 120. As such, in some embodiments, the upper-mounted shield 140 overhangs part of feeder 120 to still add distance between a meddling squirrel and grippable portions of the feeder 120 in order to prevent the squirrel from reaching the feeder 120. For example, a steep angle such as 30 degrees with respect to the vertical can be used in this case. Therefore, even though the shield 140 may not overhang below a bottom of the feeder 120, it still may prevent squirrels from accessing the feeder from above or from a side jump.

Figure 7:
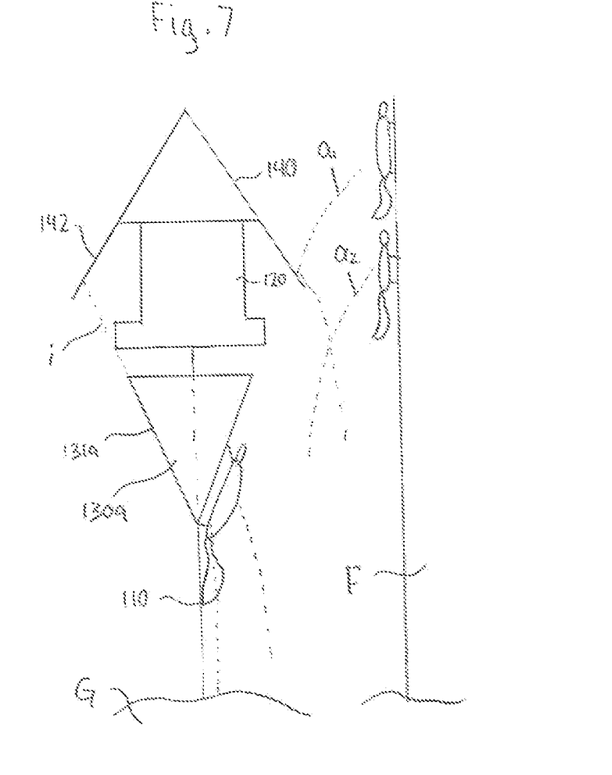
FIG. 7 illustrates a bird feeder, according to certain exemplary embodiments.

In certain embodiments, such as depicted in FIG. 7, the lower shield 130, when combined with an upper shield 140, may only include a first portion, such as the lower portion 130a depicted in FIG. 3A. In such an embodiment, the upper shield 140 may be configured to prevent squirrels from reaching feeder 120 from above and from certain side locations. In addition, the lower shield 130 may include a portion having first walls 131a that diverge from each other from bottom to top, wherein a minimal distance between the bottom of the first walls and a top of the first walls is greater than a maximum reach distance of a squirrel (e.g., 18 inches). This may prevent squirrels from reaching the feeder 120 from below. The upper shield 140 may have second walls 142 that converge toward each other from bottom to top, and overhang at least a portion of the feeder 120 to prevent squirrels from reaching the feeder from above the feeder or from the same height as the feeder 120. In certain embodiments, from a top-down view, the area covered by the second walls 142 at the bottom of the upper shield 140 surrounds the area of the first walls 131a at a top of the lower shield 130a.

If the lower shield 130 is placed at a distance close enough to the feeder 120, then with such an arrangement, squirrels will be prevented from landing on a top of the lower shield 130. Example arcs a1 and a2 are shown for unsuccessful attempts by squirrels to reach feeder 120 from an object such as a fence F or from the ground G. In some embodiments, the top of the lower shield 130 may abut the base of the feeder 120. In other embodiments, the top of the lower shield 130 may be a certain distance below the base of the feeder 120 with squirrels still being prevented from landing on a top of the lower shield 130. For example, in certain embodiments, the lower shield 130 may be placed at a distance so that an imaginary line i extending along one of the walls 130a intersects a portion of the upper shield 140. The lower shield 130 may have a top surface, such as 133a shown in FIG. 3A. In some embodiments, the surface may be substantially flat, but in other embodiments, the surface maybe rounded to have a curved shape.

Based on the various embodiments described above, the upper-mounted shield (e.g., 140) and lower-mounted shield (e.g., 130) may form a shield structure (also referred to together as a shield), that prevents squirrels from accessing a feeder (e.g., 120) of a bird feeder (e.g., 10). For example, the combined shield has been shown to be highly effective at preventing squirrels from accessing a feeder such as 120 from any direction (e.g., from the ground, from the side, or from above) even if the bird feeder 10 is placed in close proximity to a tree, fence, or other such structure. Particularly when an upper shield 140 has an angle between about 20 and 30 degrees with respect to the vertical and extends at least 3 inches horizontally from an outermost portion of feeder 120, and the lower portion 130a of a lower shield 130 has an angle of between about 30 degrees and about 45 degrees with respect to the vertical and has a length greater than the reach of a squirrel, it has been observed that squirrels do not even attempt to jump onto or climb the bird feeder.

Turning back to FIG. 1, the distances between the feeder 120, shield 130, and ground may vary. For example, in certain embodiments, a bottom of the shield 130 is at least a squirrel's-length distance from the ground, so that a squirrel cannot gain any traction from the ground in an attempt to jump up toward the shield 130. The feeder 120 including a shield 140a, 140b, or 140c may be placed a particular distance above the shield 130, such that in one embodiment, given the arc of a squirrel's jump from an adjacent object such as a tree or other vertical structure, there would be no entry point to the feeder 120 without being blocked by the shields. Exemplary ranges depicted in FIG. 1 can be, for example, 1-2 feet for the portion d1 of the post 110 below the shield 130, 2-3 feet for the portion d2 of the post 110 covered by the shield 130, and 1-2 feet for the portion d3 between the top of the shield 130 and a bottom of the feeder 120. But other distances may be used that accomplish the various goals and advantages of the embodiments disclosed above.

Certain components of the bird feeder 10 described herein may be assembled by an end user, or may be pre-fabricated. For example, a bird feeder assembly may include one or more of the components 110, 120, 130, 140, and/or the subcomponents thereof, which may be formed into the assembled bird feeder either before or after being obtained by an end user.

The above description is only used for illustrating various embodiments of the present invention rather than limiting the present invention. Although the present disclosure has been described in detail with reference to the embodiments, those skilled in the art would understand that, without departing from the spirit and scope of the present disclosure, various combinations, alterations or substitutions can be made, which should be understood as included in the protective scope of the claims.

What is claimed is:

1. A ground-mounted bird feeder comprising:
   a post;
   a feeder mounted on the post; and
   a shield attached to the post and mounted below the feeder, wherein the shield comprises:
   a first, lower portion having first walls that diverge from each other from bottom to top;
   a second, upper portion having second walls that converge toward each other from bottom to top; and
   an interface where the first lower portion of the shield meets the second upper portion of the shield,
   wherein a size and shape of the first walls at the interface is the same as the size and shape of the second walls at the interface.

2. The bird feeder of claim 1, wherein:
   the first and second walls of the shield are formed of a hard, smooth material having a surface incapable of being gripped by a squirrel.

3. The bird feeder of claim 2, wherein:
   the first and second walls are formed of sheets of metal or plastic.

4. The bird feeder of claim 3, wherein:
the first walls form an upside-down pyramid shape, and the second walls form a right-side-up pyramid shape.

5. The bird feeder of claim 4, further comprising:
a base portion at the interface that forms a base of the upside-down pyramid shape and/or a base of the right side up pyramid.

6. The bird feeder of claim 1, wherein:
the first walls have an angle with respect to the post of between 30 and 45 degrees.

7. The bird feeder of claim 6, wherein:
the second walls have an angle with respect to the post of between 20 and 30 degrees.

8. The bird feeder of claim 1, further comprising:
a first area at a first vertical height on the post where the post coincides with a bottom of the first lower portion of the shield,
wherein a minimal distance between the first area and the interface along the first walls is greater than a maximum reach distance of a squirrel.

9. The bird feeder of claim 8, wherein a minimum distance in a straight line along the first walls between the first area and the interface is at least 18 inches.

10. The bird feeder of claim 8, further comprising:
a second area at a second vertical height on the post above the first area and where the post coincides with a top of the second upper portion of the shield, wherein both the first area and second area are free from protrusions large enough to be gripped by a squirrel.

11. The bird feeder of claim 10, wherein a minimum distance in a straight line along the second walls between the interface and the second contact area is at least 15 inches.

12. The bird feeder of claim 1, wherein the feeder includes:
a base attached to the post at a location above the shield;
a container for holding bird food;
a feed tray receiving bird food from the container and from which birds can access the bird food.

13. The bird feeder of claim 12, further comprising:
an additional shield above the feeder, the additional shield having third walls that converge toward each other from bottom to top, and overhanging at least a portion of the feeder to prevent squirrels from reaching the feeder from above the feeder or from the same height as the feeder.

14. A ground-mounted bird feeder assembly comprising:
a post;
a feeder for mounting on the post; and
a shield for attaching to the post and mounting below the feeder, wherein the shield comprises:
a first, lower portion having pyramid shape or cone shape; and
a second, upper portion having a pyramid shape or a cone shape,
wherein when the first lower portion and the second upper portion are placed together to form an interface, the first lower portion forms an upside-down pyramid or cone shape, the second upper portion forms a right-side up pyramid or cone shape, and the shape and size of the top of the first lower portion matches the shape and size of the bottom of the second upper portion.

15. The bird feeder of claim 14:
wherein side walls of each of the first lower portion and the second upper portion are formed of a hard, smooth material, and when placed on the post, the side walls of the first lower portion have an angle with respect to the post of between 30 and 45 degrees.

16. The bird feeder of claim 14, further comprising:
a first mounting area at a first vertical height on the post for connecting a bottom of the first lower portion of the shield to the post; and
a first coupling assembly at the bottom of the first lower portion of the shield for connecting to the first mounting area,
wherein a minimal distance between the first coupling assembly and a top of the first lower portion of the shield is greater than a maximum reach distance of a squirrel.

17. The bird feeder of claim 16, further comprising:
a second mounting area at a second vertical height on the post above the first vertical height and for connecting a top of the second upper portion of the shield to the post; and
a second coupling assembly at the top of the second upper portion of the shield for connecting to the second mounting area,
wherein when assembled, both a first area where the first coupling assembly connects to the first mounting area, and a second area where the second coupling assembly connects to the second mounting area are free from protrusions large enough to be gripped by a squirrel.

18. The bird feeder of claim 16, further comprising:
an additional shield above the feeder, the additional shield formed of a hard smooth material and overhanging at least a portion of the feeder.

19. The bird feeder of claim 18, wherein the combination of the shield and the additional shield prevents squirrels from accessing the feeder from above, beside, or below the feeder.

20. A shield for mounting on a post below a feeder of a ground mounted bird feeder, the shield comprising:
a first, lower portion having first walls that diverge from each other from bottom to top;
a second, upper portion having second walls that converge toward each other from bottom to top;
an interface where the first lower portion of the shield meets the second upper portion of the shield; and
at least a first coupling assembly for attaching the shield to a bird feeder post,
wherein the first walls and second walls each are formed to surround a bird feeder post and are formed of a hard, smooth material whose surface prevents squirrels from gripping the walls.

21. A ground-mounted bird feeder comprising:
a post;
a feeder mounted on the post; and
a shield attached to the post, the shield including a lower shield below the feeder and an upper shield at least partly above the feeder, wherein:
the lower shield includes a first portion having first walls that diverge from each other from bottom to top, wherein a bottom of the first walls connect to the post at a first vertical height on the post, and a minimal distance between the bottom of the first walls and a top of the first walls is greater than a maximum reach distance of a squirrel, and
the upper shield has second walls that converge toward each other from bottom to top, and overhang at least a portion of the feeder to prevent squirrels from reaching the feeder from above the feeder or from the same height as the feeder,
wherein from a top-down view, the area covered by the second walls at the bottom of the upper shield surrounds the area of the first walls at a top of the first portion of the lower shield.

22. The ground-mounted bird feeder of claim 21, wherein the lower shield further includes:
   a second portion having third walls that converge toward each other from bottom to top; and
   an interface where the first portion of the lower shield meets the second portion of the lower shield,
   wherein a size and shape of the first walls at the interface is the same as the size and shape of the third walls at the interface.

23. The ground-mounted bird feeder of claim 22, wherein the first walls, second walls, and third walls are made of a hard, smooth material whose surface prevents squirrels from gripping the walls.

24. The ground-mounted bird feeder of claim 21, wherein the first walls have an angle with respect to the post of between 30 and 45 degrees, and the second walls have an angle with respect to the post of between about 20 and 30 degrees.

* * * * *